United States Patent
Reichert et al.

(10) Patent No.: US 7,383,658 B1
(45) Date of Patent: Jun. 10, 2008

(54) FISHING ROD AND REEL PROTECTION SYSTEMS

(76) Inventors: Michael T. Reichert, 4139 W. Surrey Ave., Phoenix, AZ (US) 85029; John R. Pimsner, 139 W. Surrey Ave., Phoenix, AZ (US) 85029

( * ) Notice: Subject to any disclaimer, the term of this patent is extended or adjusted under 35 U.S.C. 154(b) by 0 days.

(21) Appl. No.: 11/330,981

(22) Filed: Jan. 11, 2006

Related U.S. Application Data

(60) Provisional application No. 60/643,216, filed on Jan. 11, 2005.

(51) Int. Cl.
*A01K 97/08* (2006.01)

(52) U.S. Cl. .............................. 43/26; 43/26

(58) Field of Classification Search ............ 43/26, 43/21.2, 54.1; 206/315.11, 315.1, 315.2; 220/324; 224/922
See application file for complete search history.

(56) References Cited

U.S. PATENT DOCUMENTS

| | | | |
|---|---|---|---|
| 2,149,087 A | 2/1939 | Fisher | |
| 2,591,674 A | 4/1952 | Chalker | |
| 2,902,790 A | 9/1959 | Harvey | |
| 3,349,512 A * | 10/1967 | Walker | 43/26 |
| 3,674,190 A | 7/1972 | Wright | |
| 4,946,034 A * | 8/1990 | Matsubara | 206/315.11 |
| 4,967,504 A | 11/1990 | Craft | |
| 5,046,279 A | 9/1991 | Smith et al. | |
| D321,281 S * | 11/1991 | Cooper | D3/260 |
| 5,341,590 A * | 8/1994 | Hepworth et al. | 43/26 |
| 5,446,989 A | 9/1995 | Stange et al. | |
| 5,937,568 A | 8/1999 | Morgan | |
| 5,956,885 A | 9/1999 | Zirbes | |
| 5,960,950 A | 10/1999 | Meeker et al. | |
| D458,747 S | 6/2002 | Hields et al. | |
| 6,408,564 B1 | 6/2002 | Murphy | |
| 6,668,481 B2 * | 12/2003 | Garcia | 43/26 |
| 6,760,994 B2 | 7/2004 | Henault et al. | |
| 2002/0002791 A1 * | 1/2002 | Thompson | 43/21.2 |

FOREIGN PATENT DOCUMENTS

| | | | |
|---|---|---|---|
| GB | 1604273 | * | 12/1981 |
| GB | 2224916 A | * | 5/1990 |

* cited by examiner

*Primary Examiner*—Teri Pham Luu
*Assistant Examiner*—Joshua Michener
(74) *Attorney, Agent, or Firm*—Stoneman Volk Patent Group; Martin L. Stoneman; Michael D. Volk, Jr.

(57) ABSTRACT

A housing system related to the protective housing of a fishing rod and reel, particularly, a fly-fishing rod and reel, during transport. The system comprises a two-part housing adapted to separately compartmentalize the fishing rod and attached fishing reel. A specialized access slot allows easy installation into, and removal from, the housing. The specialized access slot also functions to fixably suspend the fishing reel in the housing interior, thus providing improved protection against damage during transport. A method of manufacture and sale is also disclosed.

10 Claims, 5 Drawing Sheets

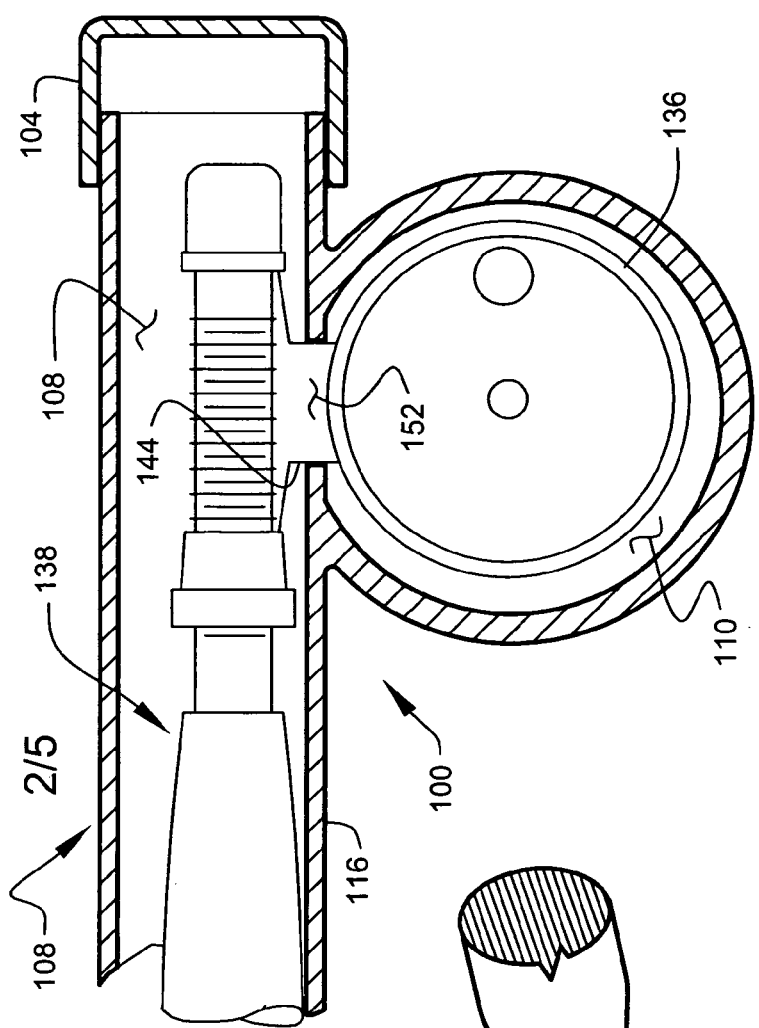
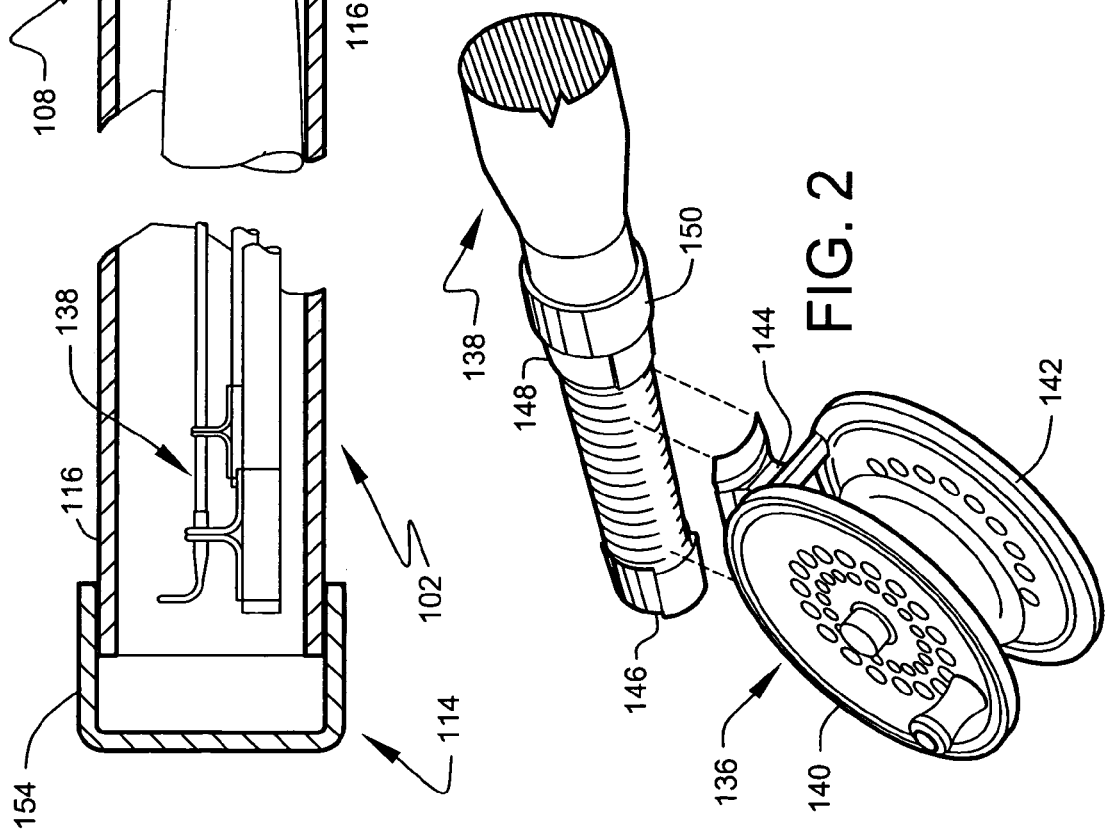

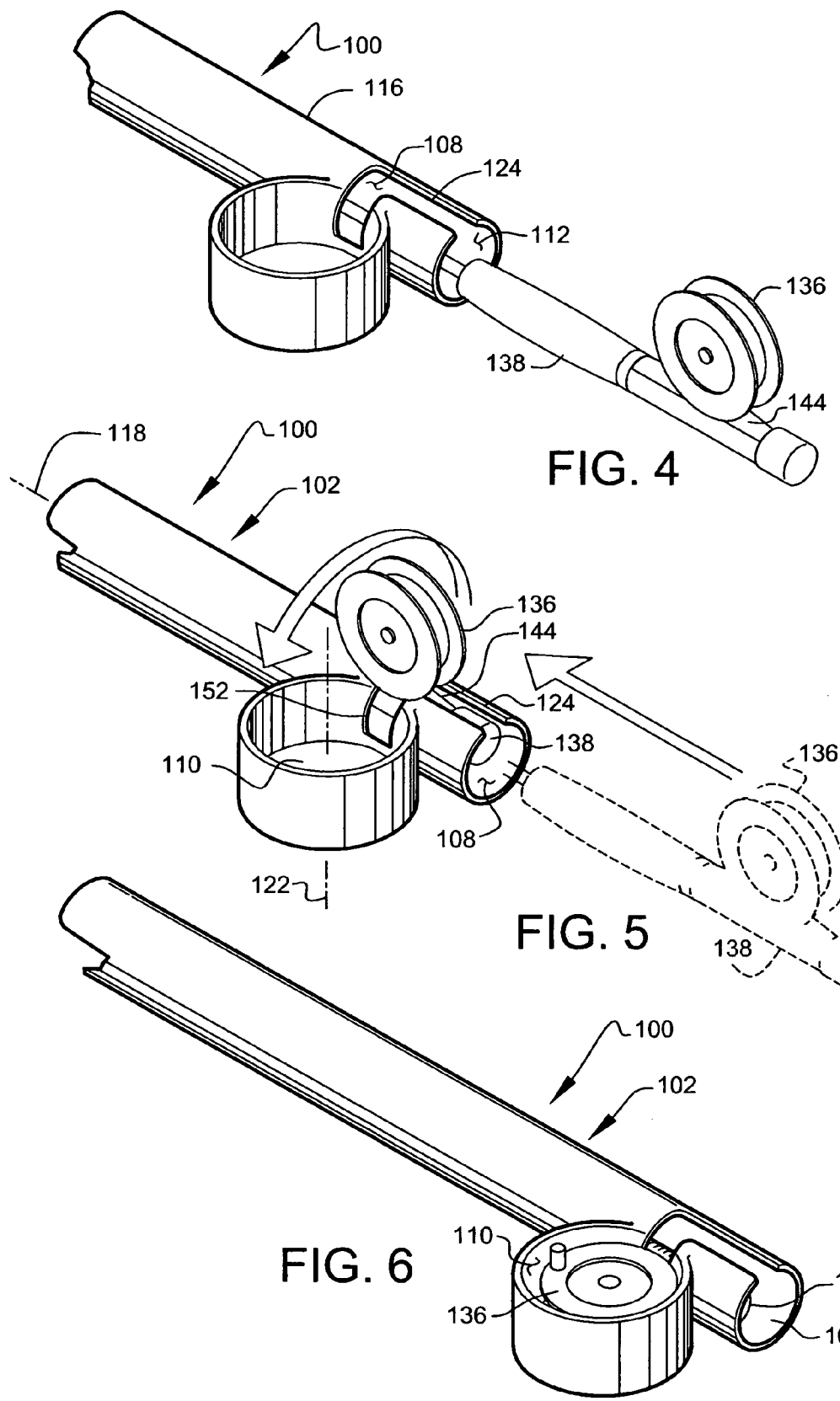

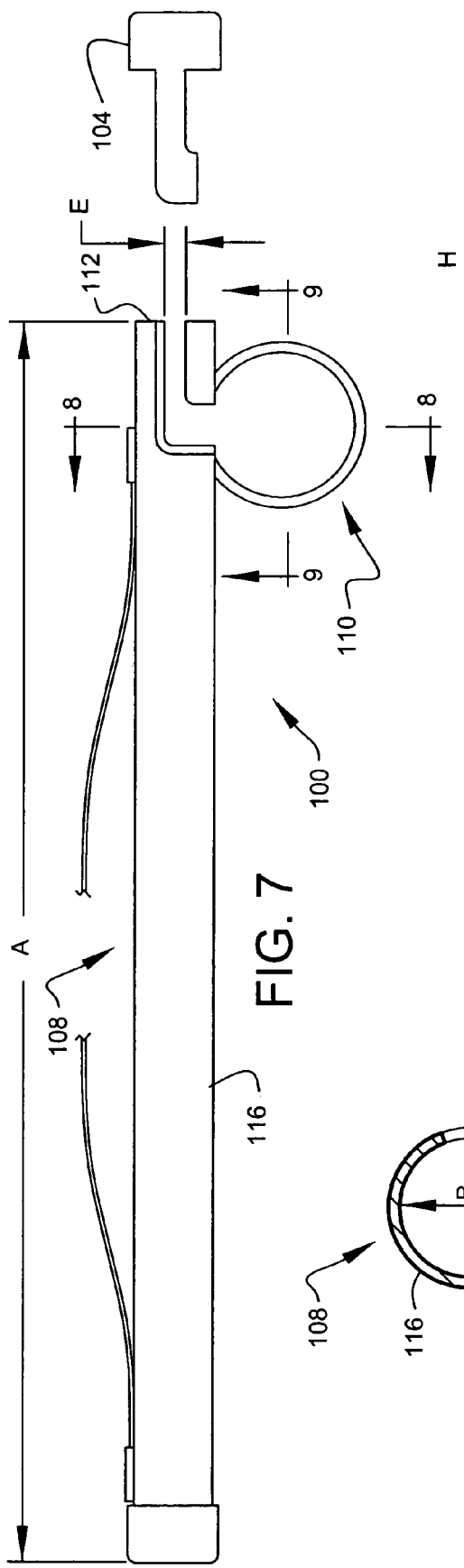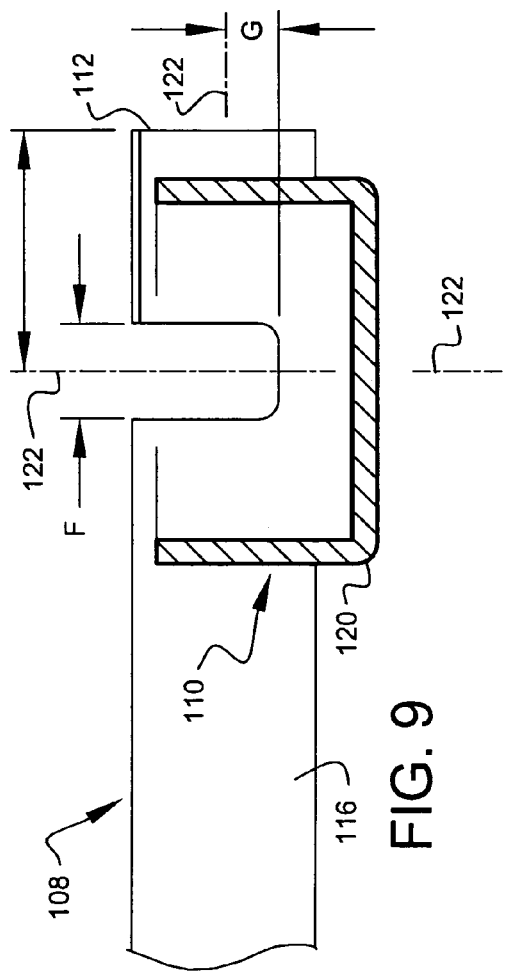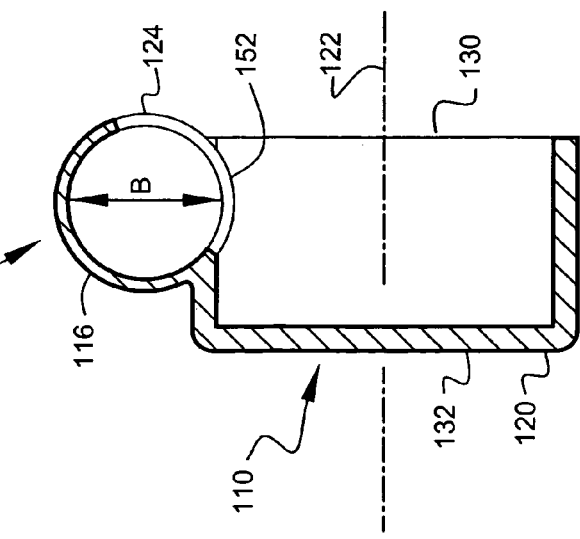

FISHING ROD AND REEL PROTECTION SYSTEMS

The present application is related to and claims priority from prior provisional application Ser. No. 60/643,216, filed Jan. 11, 2005, entitled "FISHING ROD AND REEL PROTECTION SYSTEMS", the content of which is incorporated herein by this reference and is not admitted to be prior art with respect to the present invention by the mention in this cross-reference section.

BACKGROUND

This invention relates to providing a system for improved protection of fishing rods and reels.

There are a great variety of fishing rods available and each rod has its own specific rod and reel arrangement. Fly-fishing rods and reels have a unique arrangement as the fly-fishing rod and reel is proportioned differently than other types of fishing rods and reels. On a fly-fishing rod, the mounting for the reel portion is located very near the end of the rod (since a fly-fishing rod is typically gripped only slightly above the reel) between the reel and the rod eyelets. On other commonly used rods, such as spin-casing rods, the reel is mounted about a third of the way up the rod (as the rod is gripped by the handle portion below the reel) typically extending some distance beyond the reel.

Typically, fishing rods must be transported to and from the point of use. During transportation, the rod and reel are susceptible to damage. Designing a system to limit the amount of damage and unnecessary contact of the rod and reel with potentially damaging elements during transport would greatly benefit many fishing sportsmen.

OBJECTS AND FEATURES OF THE INVENTION

A primary object and feature of the present invention is to provide a system to overcome the above-described problems.

It is a further object and feature of the present invention to provide such a system related to the protective housing of at least one fishing rod comprising at least one rod portion and at least one attached reel portion, the at least one attached reel portion comprising at least one spool portion and at least one rod-mountable foot extending from the at least one spool portion. It is a further object and feature of the present invention to provide such a system that separately compartmentalizes the fishing rod and reel. It is another object and feature of the present invention to provide such a system that isolates the fishing reel from the protective housing by contacting essentially only the rod-mounted foot of the reel. It is a further object and feature of the present invention to provide such a system that allows quick installation to, and removal of, the fishing rod and reel from the protective housing. It is yet another object and feature of the present invention to provide such a system adapted to protectively house a fly-fishing rod and reel.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a housing system, related to the protective housing of at least one fishing rod having at least one rod portion and at least one attached reel portion, wherein the at least one attached reel portion comprises at least one spool portion and at least one rod-mountable foot extending from the at least one spool portion, such system comprising: encasement means for substantially encasing the at least one fishing rod; wherein such encasement means comprises, first compartment means for compartmentalizing the at least one rod portion, second compartment means, having at least one second opening, for compartmentalizing substantially all of the at least one attached reel portion, passage means having at least one first opening for allowing passage of the at least one rod portion through only such first compartment means to a position of substantial encasement within such first compartment means, and continuous blocker means for continuously blocking the removal of the at least one rod portion from such first compartment means when any portion of the at least one attached reel portion is compartmentalized within such second compartment means.

In accordance with another preferred embodiment hereof, this invention provides a housing system, related to the protective housing of at least one fishing rod having at least one rod portion and at least one attached reel portion, wherein the at least one attached reel portion comprises at least one spool portion and at least one rod-mountable foot extending from the at least one spool portion, such system comprising: at least one encasement to substantially encase the at least one fishing rod; wherein such at least one encasement comprises, at least one first compartment adapted to compartmentalize the at least one rod portion, at least one second compartment, having at least one second opening, adapted to compartmentalize substantially all of the at least one attached reel portion, at least one passage having at least one first opening adapted to allow passage of the at least one rod portion through only such at least one first compartment to a position of substantial encasement within such at least one first compartment, and at least one continuous blocker adapted to continuously block the removal of the at least one rod portion from such at least one first compartment when any portion of the at least one attached reel portion is compartmentalized within such at least one second compartment.

Moreover, it provides such a housing system wherein such at least one passage comprises at least one interstitial channel adapted to provide at least one interstitial channel connecting such at least one first compartment with such at least one second compartment. Additionally, it provides such a housing system wherein such at least one first opening comprises at least one removable blocker adapted to removably block access to or from such at least one first opening. Also, it provides such a housing system wherein such at least one passage comprises at least one guide structured and arranged to guide the at least one reel portion to a position within such at least one second compartment.

In addition, it provides such a housing system wherein such at least one encasement comprises at least one support adapted to support such at least one encasement from at least one body-portion of a user. And, it provides such a housing system wherein: such at least one encasement further comprises at least one removable cover adapted to substantially removably cover such at least one second opening. Further, it provides such a housing system wherein: such at least one interstitial channel comprises at least one foot contact adapted to contact essentially only the at least one rod-mountable foot of the at least one attached reel portion; and such at least one foot contact comprises at least one fixed suspender adapted to assist fixed suspension of the at least one spool portion within such at least one second compartment.

Even further, it provides such a housing system wherein such at least one encasement further comprises: at least one elongated tubular sleeve comprising, at least one first end, at least one second end, and at least one tubular wall, having at least one first longitudinal axis, wherein such at least one elongated tubular sleeve defines such at least one first compartment; and at least one cylindrical sleeve comprising, at least one cylindrical wall, having at least one second longitudinal axis, wherein such at least one cylindrical sleeve defines such at least one second compartment; wherein such at least one elongated tubular sleeve and such at least one cylindrical sleeve are conjoined; wherein such at least one first end comprises such at least one opening; and wherein both such at least one elongated tubular sleeve and such at least one cylindrical sleeve comprises such at least one interstitial channel. Moreover, it provides such a housing system wherein such at least one encasement further comprises at least one substantially rigid material.

Additionally, it provides such a housing system wherein such at least one substantially rigid material comprises plastic. Also, it provides such a housing system wherein such at least one first longitudinal axis and such at least one second longitudinal axis are essentially perpendicular. In addition, it provides such a housing system wherein: such at least one elongated tubular sleeve comprises an essentially "L"-shaped slot aperture having at least one first slot portion and at least one second slot portion; such at least one first slot portion extends from such at least one first end, essentially parallel with such at least one first longitudinal axis; and such at least one second slot portion extends from such at least one first slot portion, essentially parallel with such at least one second longitudinal axis.

And, it provides such a housing system wherein such at least one second slot portion comprises such at least one interstitial channel. Further, it provides such a housing system wherein: such at least one foot contact of such at least one interstitial channel comprises at least one size-matcher adapted to size-match such at least one foot contact to the at least one rod-mountable foot of the at least one attached reel portion. Even further, it provides such a housing system wherein such at least one size-matcher comprises at least one interstitial channel width.

Even further, it provides such a housing system wherein: such at least one first compartment has an interior length of about thirty inches; and such at least one first compartment has an interior diameter of about one-and-one-half inches. Even further, it provides such a housing system wherein: such at least one second compartment has an interior length of about two inches; such at least one second compartment has an interior diameter of about three-and-one-half inches; such at least one interstitial channel is about centered adjacent such at least one second longitudinal axis; and such at least one second longitudinal axis is located about two-and-one-half inches from such at least one first end.

In accordance with another preferred embodiment hereof, this invention provides a method related to the protective housing of at least one fishing rod comprising at least one rod portion and at least one attachable reel portion, the at least one attachable reel portion comprising at least one spool portion and at least one rod mountable foot extending from the at least one spool portion, such method comprising the steps of: identifying a commercially available plurality of the at least one attachable reel portions; assembling measurement data for each at least one rod-mountable foot of such commercially available plurality; designing and manufacturing, based on such measurement data, at least one rod and reel protection system to protectively hold the at least one fishing rod attached to a specific one of such commercially available plurality of the at least one attachable reel portions, such at least one rod and reel protection system comprising, at least one first compartment adapted to compartmentalize the at least one rod portion, at least one second compartment adapted to compartmentalize substantially all of the at least one attachable reel portion, and at least one passage adapted to allow passage of the at least one attachable reel portion, to a position of substantial encasement within such at least one second compartment, wherein such at least one passage comprises at least one selected passage size adapted match each such at least one rod mountable foot of the commercially available plurality of the at least one attachable reel portions, and wherein such at least one selected size assists in isolating the at least one spool portion from essentially all contact with such at least one second compartment; and offering for sale such at least one rod and reel protection system. And it further provides a method comprising the step of offering for sale with such at least one rod and reel protection system at least one fishing rod and fishing reel comprising the at least one rod portion and the at least one attachable reel portion.

In accordance with a preferred embodiment hereof, this invention provides each and every novel feature, element, combination, step and/or method disclosed or suggested by this provisional patent application.

BRIEF DESCRIPTION OF THE DRAWINGS

FIG. 2 shows perspective view of a typical fly-fishing reel and partial perspective view of a fly-fishing rod.

FIG. 3 shows a sectional view, through a longitudinal section of the rod and reel protection system protectively encasing the typical fly-fishing reel and fly-fishing rod of FIG. 2.

FIG. 4 shows a perspective view of the typical fly-fishing reel and fly-fishing rod of FIG. 2 partially inserted into the rod and reel protection system, according to a preferred step in the method of using the present invention.

FIG. 5 shows a perspective view of the typical fly-fishing reel and fly-fishing rod of FIG. 2 partially inserted into the rod and reel protection system, according to a preferred step in the method of using the present invention.

FIG. 6 shows perspective view of the typical fly-fishing reel and fly-fishing rod of FIG. 5 protectively encased within the rod and reel protection system, according to a preferred step in the method of using the present invention.

FIG. 7 shows a side view of the rod and reel protection system according to the embodiment of FIG. 1.

FIG. 8 shows a sectional view through the section 8-8 of FIG. 7.

FIG. 9 shows a sectional view through the section 9-9 of FIG. 7.

DETAILED DESCRIPTION OF THE BEST MODES AND PREFERRED EMBODIMENTS OF THE INVENTION

Figure 1:
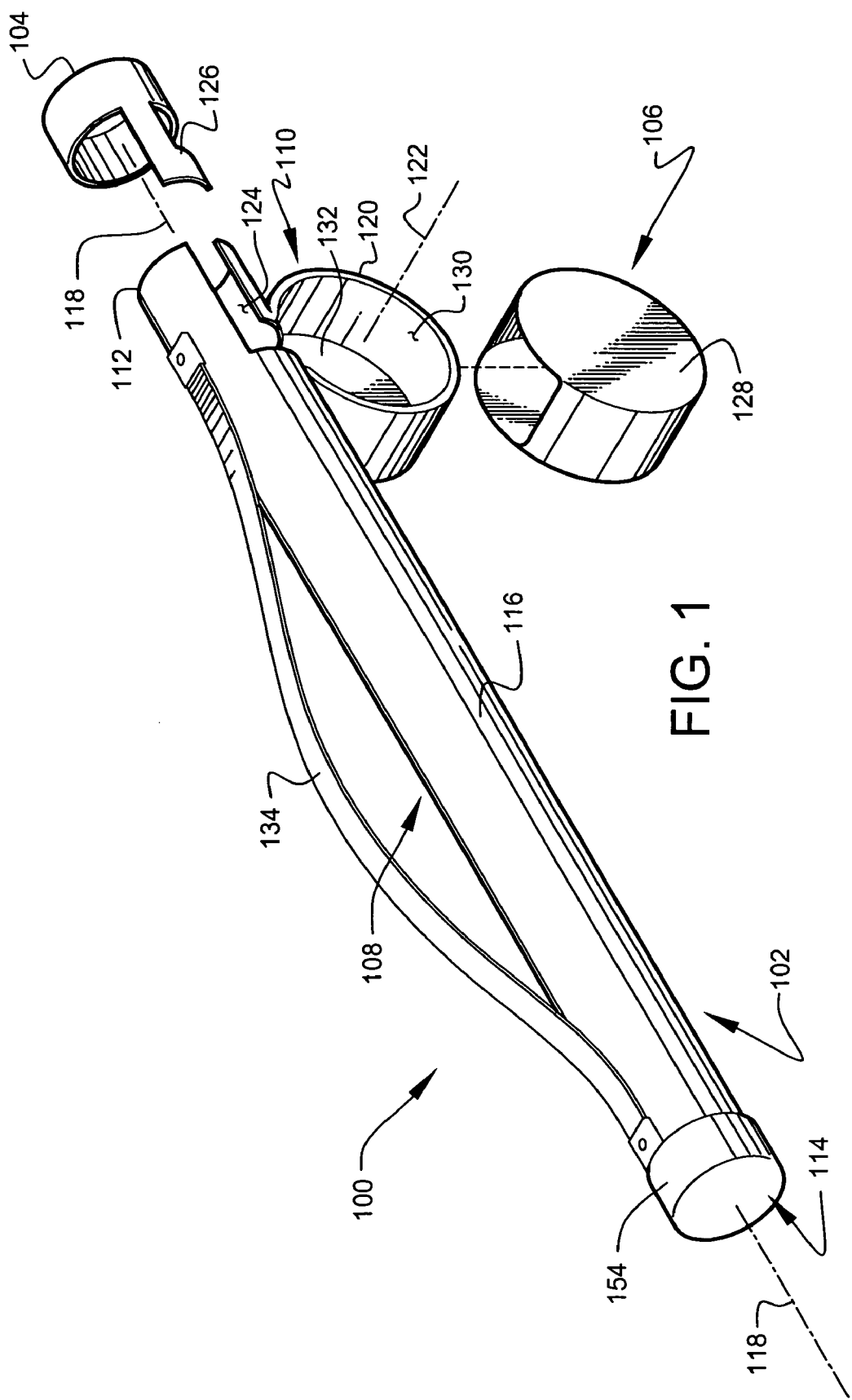
FIG. 1 shows a perspective view of a rod and reel protection system according to a preferred embodiment of the present invention.

FIG. 1 shows a perspective view of rod and reel protection system 100 according to a preferred embodiment of the present invention. Preferably, rod and reel protection system 100 is adapted to protectively encase a fishing rod having an attached reel during transportation. Most preferably, rod and reel protection system 100 is adapted to protectively encase a fly-fishing rod and fly-fishing reel, as shown. Upon reading the teachings of this specification, those with ordinary skill in the art will now understand that, under appropriate circumstances, considering issues such as, user preference, commercial trends, etc., arrangements to protectively house other fishing rod and reel combinations, such as, for example, spin-casting rods/reels, open faced rods/reels, bait-casting rods/reels, game fishing rods/reels, etc. may suffice.

Preferably, rod and reel protection system 100 comprises; housing 102, first compartment cover 104, and second compartment cover 106, as shown. Preferably, outer housing 102 (at least embodying herein encasement means for substantially encasing the at least one fishing rod with attached reel) is arranged to comprise two essentially separate interior compartments, as shown. Preferably, outer housing 102 comprises first compartment 108 adapted to protectively encase the rod portion of a fly-fishing rod and reel, and second compartment 110 adapted to protectively encase essentially all of the fly-fishing reel portion of the fly-fishing rod and reel (see also FIG. 3 for additional illustrations presenting preferred use of the present invention).

Preferably, first compartment 108 comprises an elongated tubular sleeve consisting of one open end 112, and one closed end 114, as shown. Preferably, first compartment 108 is enclosed by outer wall 116, preferably constructed from at least one protective material. Preferably, exterior wall 116 comprises a lightweight and substantially rigid material with plastic being preferred. Most preferably, exterior wall 116 comprises an impact resistant moldable plastic such as Acrylonitrile-Butadiene-Styrene (ABS) or Poly-Vinyl-Chloride (PVC). Upon reading the teachings of this specification, those with ordinary skill in the art will now understand that, under appropriate circumstances, considering issues such as, consumer preference, intended use, etc., other material selections, such as, for example, other plastics including nylon or polyamide, polycarbonate, polyethylene (PE), polyethylene terepthalate glycol (PETG), polypropylene (PP), polystyrene, PTFE, polyurethane or urethane, resin/fabric composites such as carbon fiber, aluminum, wood, etc., may suffice.

Preferably, first compartment 108 comprises first longitudinal axis 118, as shown. Preferably, first longitudinal axis 118 runs through the center of first compartment 108 preferably defining the primary axis of rotation for exterior wall 116, as shown.

Preferably, housing 102 further comprises second compartment 110, as shown. Preferably, second compartment 110 comprises cylindrical wall 120 forming a hollow cylinder for protectively housing the fly-fishing reel portion of the fly-fishing rod and reel, as shown. Preferably, cylindrical wall 120 is generally cup-shaped comprising open side 130 and closed side 132, as shown. Cylindrical wall 120 is preferably constructed from a similar lightweight and protective material as outer wall 116 with plastic being preferred. Preferably, second compartment 110 comprises second longitudinal axis 122, as shown. Preferably, second longitudinal axis 122 runs through the center of second compartment 110, preferably defining the axis of rotation for cylindrical wall 120, as shown.

Preferably, cylindrical wall 120 of second compartment 110 is permanently joined with outer wall 116 of first compartment 108, as shown. Most preferably, cylindrical wall 120 and outer wall 116 comprise a single one-piece molding, as shown. Upon reading the teachings of this specification, those with ordinary skill in the art will now understand that, under appropriate circumstances, considering issues such as, cost of materials, material selection, etc., other compartment joining arrangements, such as, permanent bonding of multiple extrusions or moldings, removable attachment using mechanical connectors, flexible attachment using elastic materials, etc., may suffice. Preferably, cylindrical wall 120 is joined with outer wall 116 such that first longitudinal axis 118 is situated essentially perpendicular with second longitudinal axis 122, as shown.

Additional protection is afforded to second compartment 110 by installing second compartment cover 106, as shown. Preferably, second compartment cover 106 comprises a substantially flexible cover 128 having an interior pocket-like portion adapted to closely surround cylindrical wall 120. Preferably, flexible cover 128 comprises elastic structures adapted to assist in maintaining second compartment cover 106 in place and to assist in maintaining the reel within second compartment 110. Upon reading the teachings of this specification, those with ordinary skill in the art will now understand that, under appropriate circumstances, considering issues such as, intended use, reel design, etc., other protective cover arrangements, such as, for example, rigid covers, zippered covers, swing-away covers, lanyard attachments, etc., may suffice.

Preferably, open end 112 of housing 102 comprises passage 124, as shown. Preferably, passage 124 extends along outer wall 116 before turning to intersect second compartment 110. Passage 124 is thus preferably arranged to couple the rod-encasing interior of first compartment 108 with the reel-encasing second compartment 110, as shown.

Preferably, open end 112 is protectively covered by end cap 104, as shown (at least embodying herein at least one removable cover adapted to removably cover such at least one passage). Preferably, end cap 104 comprises a removable cover having an interior diameter sized to fit over the outer diameter of outer wall 116. Preferably, end cap 104 is retained to outer wall 116 by a frictional engagement with outer wall 116. Preferably, end cap 104 further comprises cap extension 126 adapted to protectively cover passage 124 when installed over open end 112. Preferably, cap extension 126 is further adapted to assist in securely positioning the reel within second compartment 110. Additionally, cap extension 126 comprises a preferred shape complementary to passage 124 to provide a smooth essentially seamless appearance to outer wall 116 when coupled together/installed. Preferably, end cap 104 comprises a lightweight and substantially rigid material with plastic being preferred. Most preferably, exterior wall 116 comprises an impact resistant moldable plastic such as acrylic, butyrate (ABS) or poly vinyl chloride (PVC) matching housing 102.

In addition, housing 102 preferably comprises shoulder strap 134, as shown. Preferably, shoulder strap 134 allows rod and reel protection system 100 to be conveniently supported by the user during transport. Upon reading the teachings of this specification, those with ordinary skill in the art will now understand that, under appropriate circumstances, considering issues such as, user preference, transporting requirements, etc., other user support arrangements, such as, for example, handles, belt clips, hook and loop fasteners, etc., may suffice.

FIG. 2 shows perspective view of a typical fly-fishing reel 136 and partial perspective view of a fly-fishing rod 138. The typical fly-fishing reel 136 shown in the Figures herein comprises a spool 140 mounted on a spool carrier 142, as shown. Mounting foot 144 extends from spool carrier 142 to allow fly-fishing reel 136 to be mountable to fly-fishing rod 138, as shown.

Clamping fly-fishing reel 136 to fly-fishing rod 138 is accomplished using a stationary clamping sleeve 146 mounted near the end of fly-fishing rod 138, and having a slot into which one end of mounting foot 144 slips, and slidable clamping sleeve 148 with a slot into which the other end of mounting foot 144 slips. Slidable clamping sleeve 148 is guided towards the stationary sleeve by rotating threaded nut 150 and mating (engaging) threaded portion of fly-fishing rod 138, as shown. Thus, mounting foot 144 of fly-fishing reel 136 is clamped and held stationary within and between stationary clamping sleeve 146 and slidable clamping sleeve 148 of fly-fishing reel 136, as shown. This customary means of clamping fly-fishing reel 136 to fly-fishing rod 138 results in a portion of mounting foot 144, located between fly-fishing rod 138 and fly-fishing reel 136, to remain accessibly exposed.

FIG. 3 shows a sectional view, through a longitudinal section of rod and reel protection system 100 protectively encasing fly-fishing reel 136 and fly-fishing rod 138 of FIG. 2. Preferably, passage 124 comprises interstitial channel 152 joining first compartment 108 with second compartment 110, as shown (at least embodying herein wherein such at least one passage comprises at least one interstitial channel adapted to provide at least one interstitial channel connecting such at least one first compartment with such at least one second compartment). Preferably, interstitial channel 152 is structured and arranged to closely fit about mounting foot 144 of fly-fishing reel 136, as shown. The preferred width of interstitial channel 152 is matched to the width of mounting foot 144 to allow fly-fishing reel 136 to be easily installed/removed from second compartment 110 while effectively restraining potentially damaging movement of fly-fishing reel 136 during transport (this arrangement at least embodies herein at least one size matcher adapted to size match such at least one foot contact to the at least one rod mountable foot of the at least one attached reel portion). Preferably, the physical size and shape of interstitial channel 152 is matched with the physical size and shape of mounting foot 144, as shown, to provide steady positioning of fly-fishing reel 136 within housing 102, such that only mounting foot 144 contacts housing 102, as shown. Preferably, fly-fishing reel 136 is isolated from contact with housing 102 (this arrangement at least embodies herein wherein such at least one interstitial channel comprises at least one foot contact adapted to contact essentially only the at least one rod-mountable foot of the at least one attached reel portion). This unique and preferred suspension or "floating" arrangement of fly-fishing reel 136 within housing 102 significantly improves protection of the reel during transport (at least embodying herein wherein such at least one foot contact comprises at least one fixed suspender adapted to assist fixed suspension of the at least one spool portion within such at least one second compartment).

For convenience, most fly-fishing-fishing rods are designed to break into smaller, manageable segments, as shown. Preferably, the interior diameter and length of first compartment 108 is adapted allow storage of fly-fishing rod 138 when broken down into segments, as shown. Upon reading the teachings of this specification, those of ordinary skill in the art will now understand that, under appropriate circumstances, considering such issues as user preference, intended use, etc., other housing configurations, such as, housing compartments adapted to receive a full-length (un-segmented) rod, multiple compartments to compartmentalize individual rod segments, etc., may suffice.

Preferably, fixed end cover 154, comprises an interior diameter sized to fit over the outer diameter of outer wall 116, and is permanently bonded to closed end 114 of first compartment 108, as shown. Preferably, fixed end cover 154 comprises a lightweight and substantially rigid material. Most preferably, exterior wall 116 comprises a material matching outer wall 116, with impact resistant moldable plastic being most preferred. Upon reading the teachings of this specification, those of ordinary skill in the art will now understand that, under appropriate circumstances, considering such issues as preferred molding methods, intended use, etc., other end closure arrangements, such as, integrally molded closures, removable closures, closures comprising addition storage compartments, etc., may suffice.

FIG. 4 shows a perspective view of fly-fishing rod 138 and attached fly-fishing reel 136 partially inserted into rod and reel protection system 100, according to a preferred step in the method of using the present invention. Advantages of rod and reel protection system 100 are clearly illustrated by describing the system during use. Preferred arrangements of rod and reel protection system 100 allow fly-fishing rod 138 and attached fly-fishing reel 136 to be quickly and conveniently installed within, and removed from, housing 102, as illustration in the following Figures.

Preferably, fly-fishing rod 138 and attached fly-fishing reel 136 are protectively positioned within housing 102 by initially inserting the end of fly-fishing rod 138 (opposite fly-fishing reel 136) by passing the end of fly-fishing rod 138 into open end 112 of first compartment 108, as shown. Preferably, as fly-fishing rod 138 moves into first compartment 108 mounting foot 144 (of fly-fishing reel 136) is positioned to generally align with passage 124 (of outer wall 116), as shown.

FIG. 5 shows a perspective view of fly-fishing rod 138 and attached fly-fishing reel 136 partially inserted into rod and reel protection system 100, according to a subsequent preferred step in the method of using the present invention. Preferably, fly-fishing rod 138 and attached fly-fishing reel 136 are advanced forward into housing 102 with fly-fishing rod 138 moving further into first compartment 108 and fly-fishing reel 136 approaching second compartment 110, guided by mounting foot 144 moving along passage 124, as shown (at least embodying herein wherein such at least one passage comprises at least one guide structured and arranged to guide the at least one reel portion to a position within such at least one second compartment). As mounting foot 144 moves to a stopped position adjacent second compartment 110, passage 124 transitions from a slot having a linear orientation essentially parallel with first longitudinal axis 118 to a slot comprising interstitial channel 152 having a linear orientation following the outer diameter of exterior wall 116 and substantially parallel with second longitudinal axis 122, as shown. Preferably, fly-fishing rod 138 and attached fly-fishing reel 136 are rotated to place fly-fishing reel 136 within second compartment 110, as shown.

FIG. 6 shows perspective view of fly-fishing rod 138 and attached fly-fishing reel 136 protectively encased within rod and reel protection system 100, according to a preferred method of using the present invention. Preferably, in such protected position (of FIG. 6), fly-fishing rod 138 and attached fly-fishing reel 136 are essentially ready for transport. It should be noted that fly-fishing rod 138 passes only through first compartment 108 during installation. Preferably, the user places the remaining segments of fly-fishing rod 138 within first compartment 108 and secures end cap 104 over open end 112 (see FIG. 3). User may also install second compartment cover 106 over second compartment 110 to provide yet further protection to fly-fishing rod 138 and attached fly-fishing reel 136 during transport.

Following the above-described steps in reverse removes fly-fishing rod 138 and attached fly-fishing reel 136 from housing 102. It should be noted that that users of rod and reel protection system 100 will generally be able to perform the above-described installation and removal steps in a matter of seconds rather than minutes. It is also significant to note that even without the installation of end cap 104 and second compartment cover 106, attached fly-fishing reel 136 is essentially "locked" within housing 102 as long as any portion of fly-fishing reel 136 is contained within second compartment 110, as shown (this arrangement at least embodies herein continuous blocker means for continuously blocking the removal of the at least one rod portion from such first compartment means when any portion of the at least one attached reel portion is compartmentalized within such second compartment means).

FIG. 7 shows a side view of the rod and reel protection system 100 according to the embodiment of FIG. 1. FIG. 8 shows a sectional view through the section 8-9 of FIG. 7. FIG. 9 shows a sectional view through the section 9-9 of FIG. 7. Referring to FIG. 7, FIG. 8, and FIG. 9, preferred embodiments of rod and reel protection system 100 are generically sized to accommodate the physical storage requirements of a plurality of commercially available fishing rods and reels. In addition, alternate preferred embodiments of rod and reel protection system 100 are adapted to house a specific rod and reel combination (or group of similarly dimensioned combination rod and reels). Moreover, preferred embodiments of rod and reel protection system 100 are preferably supplied in the form of a packaged rod and/or reel kit. It should be noted that the dimensions of FIG. 7, FIG. 8, and FIG. 9 are representative of only one preferred illustrative embodiment and that other embodiments comprising other preferred dimensions are within the scope of the present invention.

Preferably, first compartment 108 of housing 102 comprises an overall length "A" of about 30 inches and an interior diameter "B" of about 1½ inches. Preferably, second compartment 110 comprises an inner diameter "C" of about 3½ inches and an interior depth "D" of about 2 inches. Preferably, passage 124 (extending from open end 112 essentially parallel with first longitudinal axis 118) comprises a slot width "E" of about one half inch. Passage 124 preferably turns to essentially align with second longitudinal axis 122 and form interstitial channel 152 having a slot width "F" of about 1-inch. Preferably, interstitial channel 152 is approximately centered on second longitudinal axis 122, as shown.

Thus it is illustrated that passage 124 preferably comprises an essentially "L"-shaped slot aperture having at least one first slot portion and at least one second slot portion (interstitial channel 152); such at least one first slot portion extending from a first end (open end 112) of first compartment 108 essentially parallel with such at least first longitudinal axis (first longitudinal axis 118); and such at least one second slot portion (interstitial channel 152) extending from such at least one first slot portion essentially parallel with such at least one second longitudinal axis (second longitudinal axis 122).

Preferably, interstitial channel 152 extends past first longitudinal axis 118 a distance "G" of about 9/16 inch. Preferably, the linear distance "H" as measured between longitudinal axis 122 and open end 112 is about 2½ inches.

Figure 10:
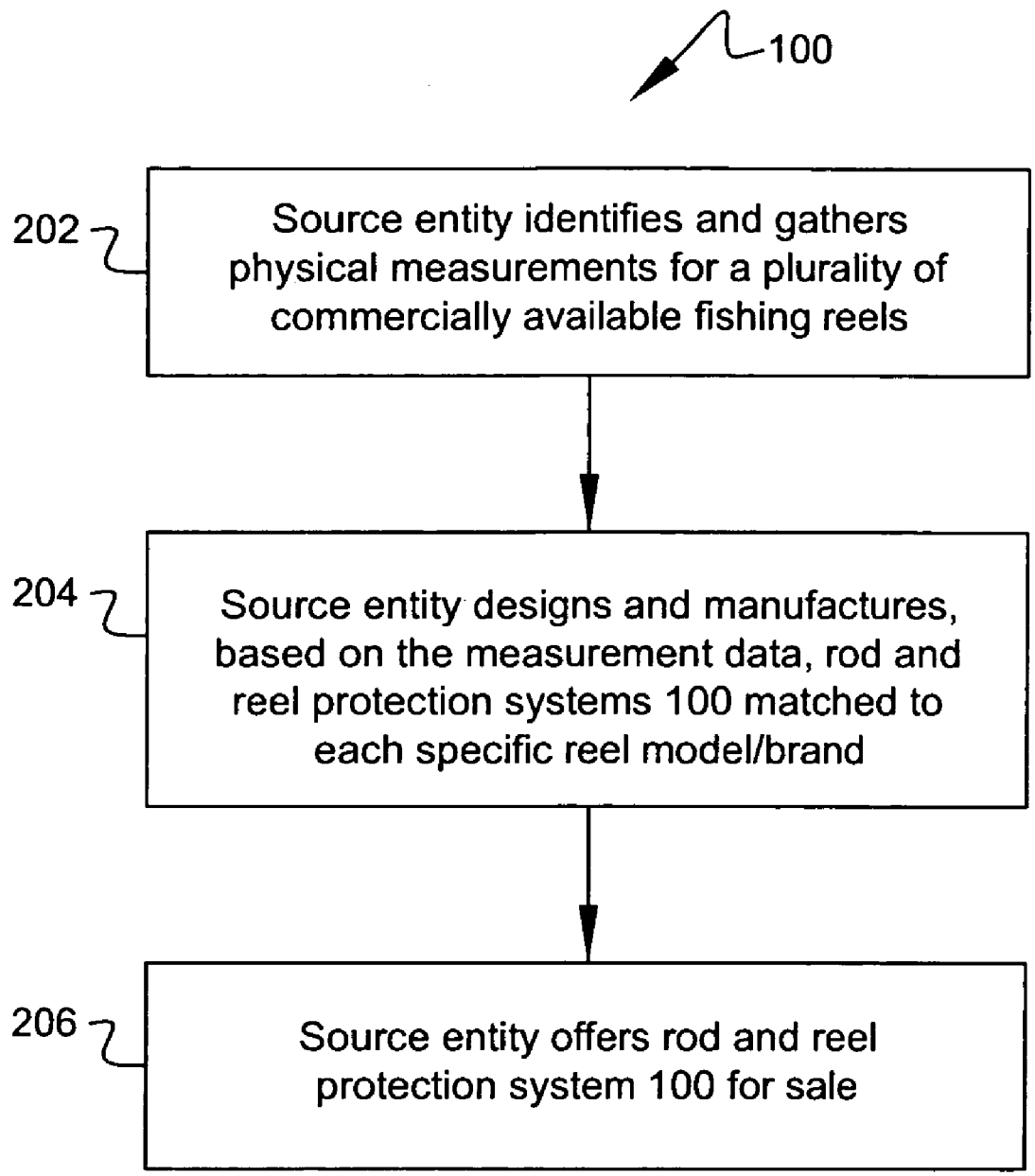
FIG. 10 shows a diagram illustrating a preferred method of designing, manufacturing and selling the rod and reel protection system according to the present invention.

FIG. 10 shows a diagram illustrating a preferred method of designing, manufacturing and selling rod and reel protection system 100 according to the present invention. As previously discussed, housing 102 of rod and reel protection system 100 is adapted to closely engage mounting foot 144 of fly-fishing reel 136. Many popular reels comprise unique dimensional characteristics and thus require specific housing arrangements within the present invention. The development of reel and rod specific embodiments is accomplished by means of the following preferred method of the present invention.

First, a source entity identifies a plurality of commercially available fishing reels as illustrated in step 202. Preferably, the source entity gathers physical measurement data on available reel models from a variety of target manufactures. In some cases, the source entity may receive physical data directly from manufacturers, for example, after entering into an agreement with a reel manufacturer to supply rod and reel protection systems for OEM (Original Equipment Manufacturer) branding and distribution.

Preferably, after the source entity has assembled measurement data for each target reel, the source entity designs and manufactures, based on the measurement data, rod and reel protection systems 100 matched to each specific reel model/brand as indicated in step 204. Preferably, the step 204 comprises such actions as; contracting with one or more manufacturers capable of producing the specific rod and reel protection systems 100, providing design specifications generated from the gathered measurement data, providing product shipping data allowing the manufacturer to distribute finished product to retail sites, etc.

Finally, source entity offers rod and reel protection system 100 for sale as indicated in step 206. Preferably, reel protection system 100 is offered for sale independently of the reel to be contained. Alternately, as preferred aspect of the sale step 206 as embodied herein, reel protection system 100 may be sold in combination with fly-fishing rod 138 and/or fly-fishing reel 136.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A housing system, related to the protective housing of at least one fishing rod having at least one rod portion and at least one attached reel portion, wherein the at least one attached reel portion comprises at least one spool portion and at least one rod-mountable foot extending from the at least one spool portion, said system comprising:
 a) at least one encasement to substantially encase the at least one fishing rod;
 b) wherein said at least one encasement comprises
  i) at least one first compartment adapted to compartmentalize the at least one rod portion,
  ii) at least one second compartment, having at least one second opening, adapted to compartmentalize substantially all of the at least one attached reel portion,
  iii) at least one passage having at least one first opening adapted to allow passage of the at least one rod portion through only said at least one first compartment to a position of substantial encasement within said at least one first compartment, and
  iv) at least one continuous blocker adapted to continuously block the removal of the at least one rod portion from said at least one first compartment when at least one portion of the at least one attached reel portion is compartmentalized within said at least one second compartment;
  v) wherein said at least one passage comprises at least one interstitial channel connecting said at least one first compartment with said at least one second compartment;

vi) wherein said at least one interstitial channel comprises at least one foot contact adapted to contact essentially only the at least one rod-mountable foot of the at least one attached reel portion;
vii) wherein said at least one foot contact comprises at least one fixed suspender adapted to assist fixed suspension of the at least one spool portion within said at least one second compartment;
viii) wherein said at least one encasement further comprises
  (1) at least one elongated tubular sleeve comprising,
  (2) at least one first end,
  (3) at least one second end, and
  (4) at least one tubular wall, having at least one first longitudinal axis,
  (5) wherein said at least one elongated tubular sleeve defines said at least one first compartment; and
  (6) at least one cylindrical sleeve comprising
    (a) at least one cylindrical wall, having at least one second longitudinal axis,
    (b) wherein said at least one cylindrical sleeve defines said at least one second compartment;
  (7) wherein said at least one elongated tubular sleeve and said at least one cylindrical sleeve are conjoined;
  (8) wherein said at least one first end comprises said at least one opening;
  (9) wherein both said at least one elongated tubular sleeve and said at least one cylindrical sleeve comprise said at least one interstitial channel;
  (10) wherein said at least one elongated tubular sleeve comprises an essentially L-shaped slot aperture having at least one first slot portion and at least one second slot portion;
  (11) wherein said at least one first slot portion extends from said at least one first end, essentially parallel with said at least one first longitudinal axis;
  (12) wherein said at least one second slot portion extends from said at least one first slot portion, essentially parallel with said at least one second longitudinal axis;
  (13) wherein said at least one second slot portion comprises said at least one interstitial channel;
ix) wherein said at least one foot contact of said at least one interstitial channel comprises at least one size-matcher adapted to size-match said at least one foot contact to the at least one rod-mountable foot of the at least one attached reel portion.

2. The housing system according to claim 1 wherein said at least one size-matcher comprises at least one interstitial channel width.

3. The housing system according to claim 1 wherein:
  a) said at least one first compartment has an interior length of about thirty inches; and
  b) said at least one first compartment has an interior diameter of about one-and-one-half inches.

4. The housing system according to claim 1 wherein:
  a) said at least one second compartment has an interior length of about two inches;
  b) said at least one second compartment has an interior diameter of about three-and-one-half inches;
  c) said at least one interstitial channel is about centered adjacent said at least one second longitudinal axis; and
  d) said at least one second longitudinal axis is located about two-and-one-half inches from said at least one first end.

5. The housing system according to claim 1 wherein said at least one passage comprises at least one guide structured and arranged to guide the at least one reel portion to a position within said at least one second compartment.

6. The housing system according to claim 1 wherein said at least one encasement comprises at least one support adapted to support said at least one encasement from at least one body-portion of a user.

7. The housing system according to claim 1 wherein:
  a) said at least one encasement further comprises at least one removable cover adapted to removably cover said at least one second opening.

8. The housing system according to claim 1 wherein said at least one encasement further comprises at least one substantially rigid material.

9. The housing system according to claim 8 wherein said at least one substantially rigid material comprises at least one plastic.

10. The housing system according to claim 1 wherein said at least one first longitudinal axis and said at least one second longitudinal axis are essentially perpendicular.

* * * * *